United States Patent [19]
Mickelson

[11] Patent Number: 6,115,889
[45] Date of Patent: Sep. 12, 2000

[54] HORSE TETHER DEVICE AND METHOD OF USE THEREOF

[76] Inventor: Charles E. Mickelson, 178 N. Fillmore, Laramie, Wyo. 82070

[21] Appl. No.: 09/235,188

[22] Filed: Jan. 22, 1999

[51] Int. Cl.[7] .............................. A44B 21/00; F16G 11/00
[52] U.S. Cl. ........................ 24/115 R; 24/164; 24/136 R
[58] Field of Search .............................. 24/115 R, 136 R, 24/68 CD, 164, 136 A; 119/772

[56] References Cited

U.S. PATENT DOCUMENTS

| | | | |
|---|---|---|---|
| 297,241 | 4/1884 | Egge | 24/115 R |
| 436,315 | 9/1890 | Peck | 24/136 R |
| 497,900 | 5/1893 | Warner | 24/115 R |
| 557,800 | 4/1896 | Gray | 24/115 R |
| 843,689 | 2/1907 | McClintock | 24/136 R |
| 3,332,121 | 7/1967 | Curtis | 24/115 R |
| 4,186,690 | 2/1980 | Seller | 119/772 |

*Primary Examiner*—Victor N. Sakran
*Attorney, Agent, or Firm*—William E. Hein

[57] ABSTRACT

A tether device for horses and other animals includes a flat rear mounting plate for fixedly mounting the device to a stall or barn wall, for example. A web plate is formed to protrude perpendicularly forward from the mounting plate. A rope slot is formed between an upwardly extending hook portion of the web plate and the rear mounting plate. A spring clip is hingedly attached to the rear mounting plate in alignment with the hook portion of the web plate, the spring clip being arranged to urge itself into a quiescent position against the inner surface of the hook portion of the web plate. A pawl having a toothed, arcuate peripheral surface facing an inner surface of the web plate, is hingedly mounted to the front surface of the rear mounting plate. A coil spring positioned between the pawl and the rear mounting plate serves to rotate the toothed peripheral surface of the pawl upward into a quiescent position against the inner surface of the web plate.

6 Claims, 2 Drawing Sheets

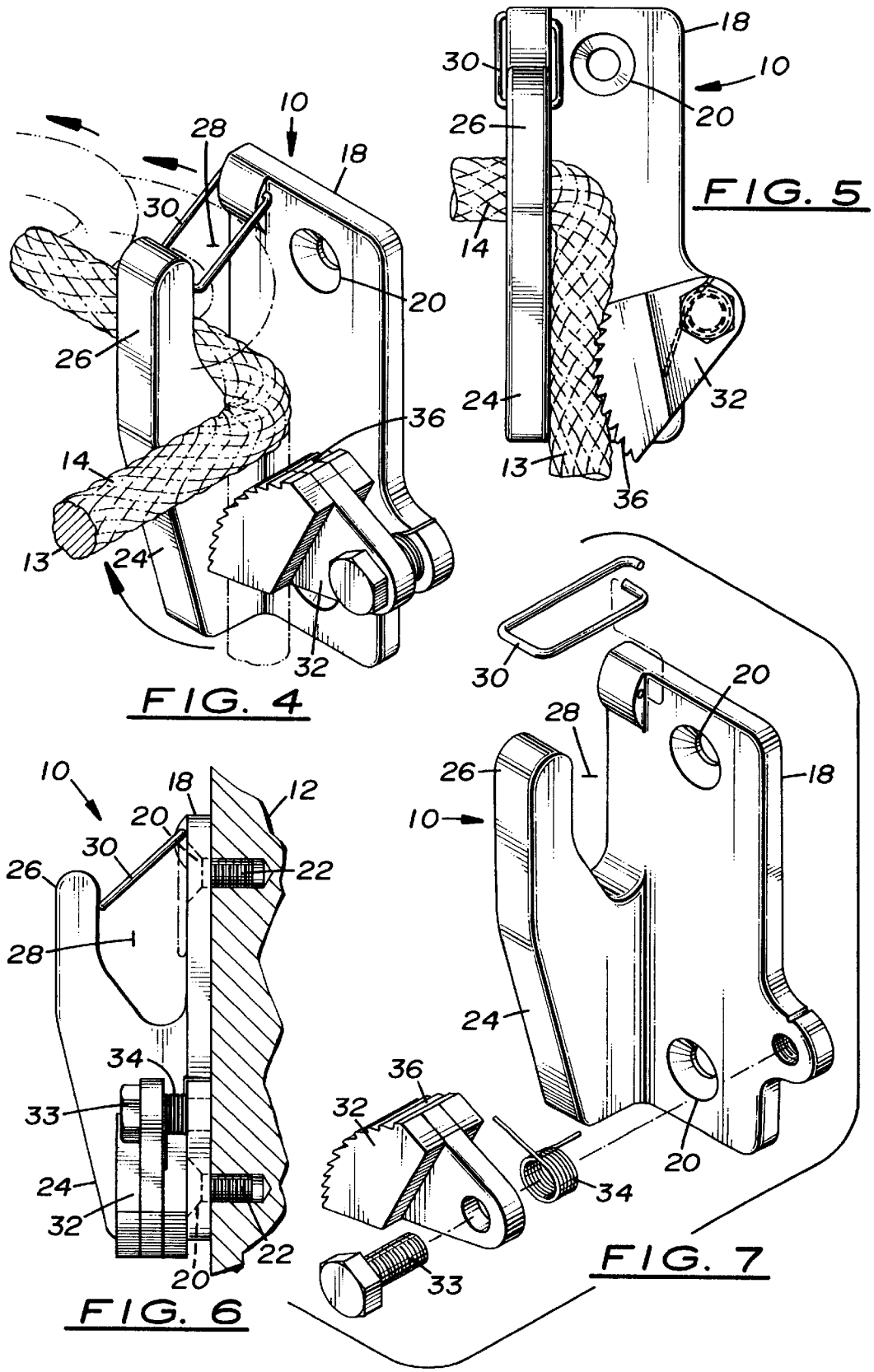

HORSE TETHER DEVICE AND METHOD OF USE THEREOF

BACKGROUND AND SUMMARY OF THE INVENTION

This invention relates generally to devices for tethering horses and other livestock and, more particularly to an improved tether device that allows a handler to quickly tie and untie animals using just one hand.

In the past, horses have been tied to hitching rails, fences, trees, etc. These methods of tethering horses have been disadvantageous in that they all require that the handler use both hands to tie and untie the knots that are required to secure the free end of a lead rope.

It would therefore be advantageous to provide an improved tether device for horses and other livestock that allows the handler to quickly and easily secure and release the free end of a rope to which the animal is tethered.

In accordance with the illustrated preferred embodiment of the present invention, a tether device is provided to include a flat rear mounting plate for fixedly mounting the device to a stall or barn wall, for example. A web plate is formed to protrude perpendicularly forward from the mounting plate. A rope slot is formed in the space between an upwardly extending hook portion of the web plate and the rear mounting plate. A spring clip is hingedly attached to the rear mounting plate in alignment with the hook portion of the web plate, the spring clip being arranged to urge itself into a quiescent position against the inner surface of the hook portion of the web plate. A pawl having a toothed, arcuate peripheral surface facing an inner surface of the web plate, is hingedly mounted to the front surface of the rear mounting plate. A coil spring positioned between the pawl and the rear mounting plate serves to rotate the toothed peripheral surface of the pawl upward into a quiescent position against the inner surface of the web plate.

BRIEF DESCRIPTION OF THE DRAWINGS

FIG. 4 is a detailed pictorial diagram illustrating the way in which the lead rope of FIGS. 1–3 is removed from the tether device of the present invention.

FIG. 5 is a front view of the tether device of the present invention with a lead rope secured therein.

FIG. 6 is a right side view of the tether device of the present invention.

FIG. 7 is a detailed pictorial assembly diagram of the tether device of the present invention.

DESCRIPTION OF THE PREFERRED EMBODIMENT

Figure 1:
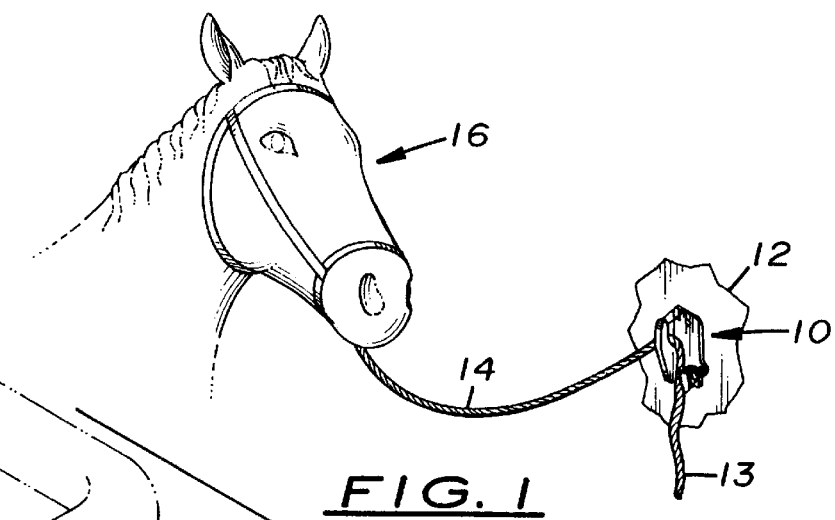
FIG. 1 is a general pictorial diagram illustrating a horse whose lead rope is secured to the tether device of the present invention.

Referring now to FIG. 1, there is shown a tether device 10 fixedly mounted to a wall 12 for securely retaining the free end 13 of a lead rope 14, the other end of which is attached to a halter worn by a horse 16. Wall 12 to which tether device 10 is mounted may comprise, for example, an interior or exterior wall of a stall, a barn or a trailer, or even a fence post or hitching rail. Tether device 10 may be fabricated of any of a number of materials such as aluminum, steel or plastic.

Referring now generally to the detailed pictorial diagrams of FIGS. 2–7, there is shown the tether device 10 having a flat rear mounting plate 18 having upper and lower mounting holes 20 through which mounting bolts 22 are placed to secure tether device 10 to wall 12. A web plate 24 is formed to protrude perpendicularly forward from rear mounting plate 18 adjacent the left edge thereof. A hook portion 26 of web plate 24 extends upwardly from the base thereof. A rope slot 28 is formed in the space between hook portion 26 of web plate 24 and rear mounting plate 18. A conventional spring clip 30 is hingedly attached to the front surface of rear mounting plate 18 in the upper lefthand corner thereof in alignment with the hook portion 26 of web plate 24. Spring clip 30 is arranged to be sufficiently long so that, in the absence of an external downward force applied thereto, it is urged upward into a quiescent position against the inner surface of hook portion 26 of web plate 24. When the user applies a downward force on spring clip 30, it may be moved into the position shown in phantom in FIG. 6, against the front surface of rear mounting plate 18. A pawl 32 is hingedly mounted to the front surface of rear mounting plate 18 proximate the lower righthand corner thereof. Pawl 32 may be mounted using any of a number of conventional fasteners, such as a bolt 33 or a rivet, for example. Pawl 32 includes an arcuate outer peripheral surface 36 having a plurality of teeth thereon. A coil spring 34, positioned on bolt 33 between pawl 32 and rear mounting plate 18 serves to rotate the toothed peripheral surface 36 of pawl 32 upward into a quiescent position against the inner surface of web plate 24.

Figure 2:
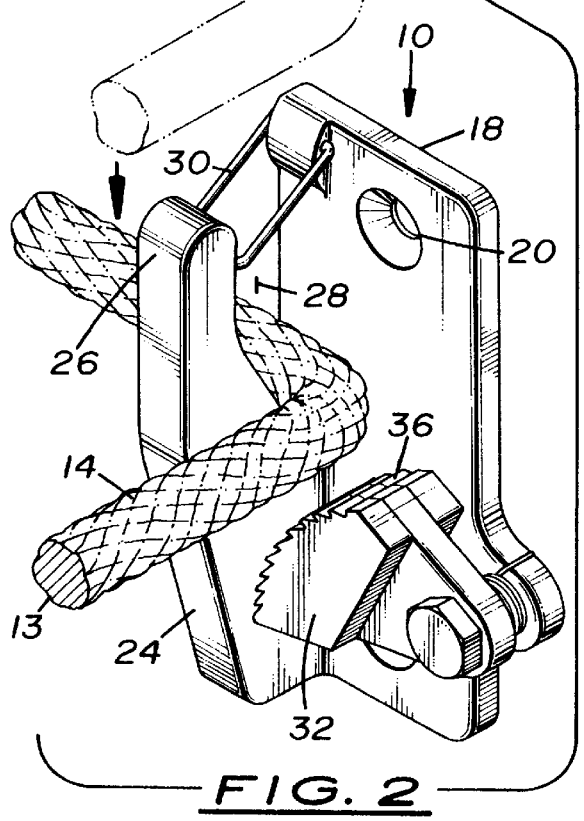
FIG. 2 is a detailed pictorial diagram illustrating the way in which a lead rope is initially introduced into the tether device of the present invention.
Figure 3:
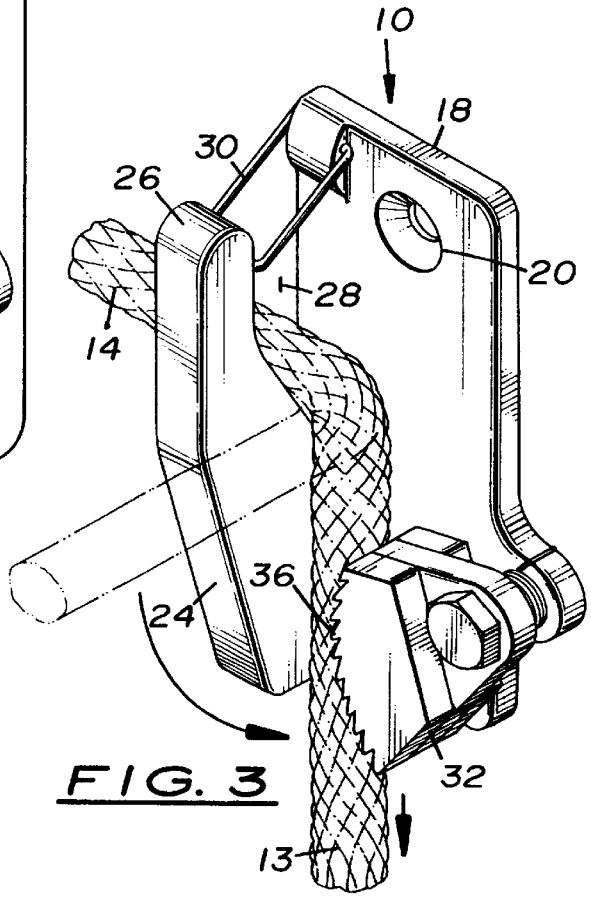
FIG. 3 is a detailed pictorial diagram illustrating the way in which the lead rope of FIGS. 1 and 2 is finally secured within the tether device of the present invention.

In using tether device 10 of the present invention to tie a horse or other animal, the free end 13 of rope 14 is moved downwardly from the position illustrated in phantom in FIG. 2, past spring clip 30, to the position in which it is shown within rope slot 28. In the same motion, the user moves the free end 13 of rope 14 further downward to the position illustrated in FIG. 3 in which it is at rest between web plate 24 and the toothed surface 36 of pawl 32. In this position, any tugging force on rope 14 produced by horse 16 will simply produce an upward rotational force on pawl 32, which will in turn produce a compressive force on the portion of rope 14 positioned between the toothed surface 36 of pawl 32 and the web plate 24.

In order to release the rope 14 from tether device 10, the user simply pulls the free end 13 outwardly from its position between the toothed surface 36 of pawl 32 and the web plate 24 to the position illustrated in FIG. 4. As illustrated in phantom in FIG. 4, the user then lifts the free end 13 of rope 14 into a position on top of spring clip 30 and then downward past spring clip 30 to form a loop within rope slot 28, which may then be pulled to the left to remove the loop from rope slot 28.

I claim:

1. A tether device for securely retaining the free end of a lead rope attached to a horse or other animal, the tether device comprising:

a generally flat rear mounting plate for fixedly mounting the tether device to a desired frame member;

a web plate protruding perpendicularly forward from the rear mounting plate, the web plate having an upwardly extending hook portion spaced forward of said rear mounting plate so as to form a rope slot between the hook portion of said web plate and the rear mounting plate;

a spring clip hingedly attached to the rear mounting plate in alignment with the hook portion of the web plate, the spring clip being arranged to urge itself into a quiescent position against an inner surface of the hook portion of the web plate;

a pawl having a toothed, arcuate peripheral surface facing an inner surface of the web plate and being hingedly mounted to a front surface of the rear mounting plate; and a coil spring positioned between the pawl and the rear mounting plate for rotating the toothed peripheral surface of the pawl upward into a quiescent position against the inner surface of the web plate.

2. A rope retention device for securely retaining the free end of a rope, the device comprising:

a generally flat rear mounting plate for fixedly mounting the device to a desired frame member;

a web plate protruding perpendicularly forward from the rear mounting plate, the web plate having an upwardly extending hook portion spaced forward of said rear mounting plate so as to form between the hook portion of said web plate and the rear mounting plate;

a spring clip hingedly attached to the rear mounting plate in alignment with the hook portion of the web plate, the spring clip being arranged to urge itself into a quiescent position against an inner surface of the hook portion of the web plate;

a pawl having a toothed, arcuate peripheral surface facing an inner surface of the web plate and being hingedly mounted to a front surface of the rear mounting plate; and a coil spring positioned between the pawl and the rear mounting plate for rotating the toothed peripheral surface of the pawl upward into a quiescent position against the inner surface of the web plate.

3. A method for releasably retaining the free end of a lead rope attached to a horse or other animal, the method comprising:

providing a rope retention device having a generally flat rear mounting plate for fixedly mounting the device to a desired frame member, the device having a web plate protruding perpendicularly forward from the rear mounting plate, the web plate having an upwardly extending hook portion spaced forward of the rear mounting plate so as to form a rope slot between the hook portion of said web plate and the rear mounting plate, the device having a spring clip hingedly attached to the rear mounting plate in alignment with the hook portion of the web plate, the spring clip being arranged to urge itself into a quiescent position against an inner surface of the hook portion of the web plate, the device having a pawl with a toothed, arcuate peripheral surface facing an inner surface of the web plate and being hingedly mounted to a front surface of the rear mounting plate, the device having a coil spring positioned between the pawl and the rear mounting plate for rotating the toothed peripheral surface of the pawl upward into a quiescent position against the inner surface of the web plate;

positioning the free end of the rope horizontally over the spring clip;

moving the free end of the rope so positioned downwardly past the spring clip, into the rope slot, and then into a position between the web plate and the toothed peripheral surface of the pawl.

4. A method for releasably retaining the free end of a lead rope as in claim 3, further comprising the steps of:

moving the free end of the rope outwardly from its position between the web plate and the toothed peripheral surface of the pawl;

lifting the free end of the rope into a generally horizontal position above the spring clip; and moving the free end of the rope downwardly past the spring clip to form a loop of rope within the rope slot; and pulling the loop of rope laterally from within the rope slot to remove it therefrom.

5. A method for releasably retaining the free end of a rope, the method comprising:

providing a rope retention device having a generally flat rear mounting plate for fixedly mounting the device to a desired frame member, the device having a web plate protruding perpendicularly forward from the rear mounting plate, the web plate having an upwardly extending hook portion spaced forward of the rear mounting plate so as to form a rope slot between the hook portion of said web plate and the rear mounting plate, the device having a spring clip hingedly attached to the rear mounting plate in alignment with the hook portion of the web plate, the spring clip being arranged to urge itself into a quiescent position against an inner surface of the hook portion of the web plate, the device having a pawl with a toothed, arcuate peripheral surface facing an inner surface of the web plate and being hingedly mounted to a front surface of the rear mounting plate, the device having a coil spring positioned between the pawl and the rear mounting plate for rotating the toothed peripheral surface of the pawl upward into a quiescent position against the inner surface of the web plate;

positioning the free end of the rope horizontally over the spring clip;

moving the free end of the rope so positioned downwardly past the spring clip, into the rope slot, and then into a position between the web plate and the toothed peripheral surface of the pawl.

6. A method for releasably retaining the free end of a rope as in claim 5, further comprising the steps of:

moving the free end of the rope outwardly from its position between the web plate and the toothed peripheral surface of the pawl;

lifting the free end of the rope into a generally horizontal position above the spring clip; and moving the free end of the rope downwardly past the spring clip to form a loop of rope within the rope slot; and pulling the loop of rope laterally from within the rope slot to remove it therefrom.

* * * * *